Figure 1:
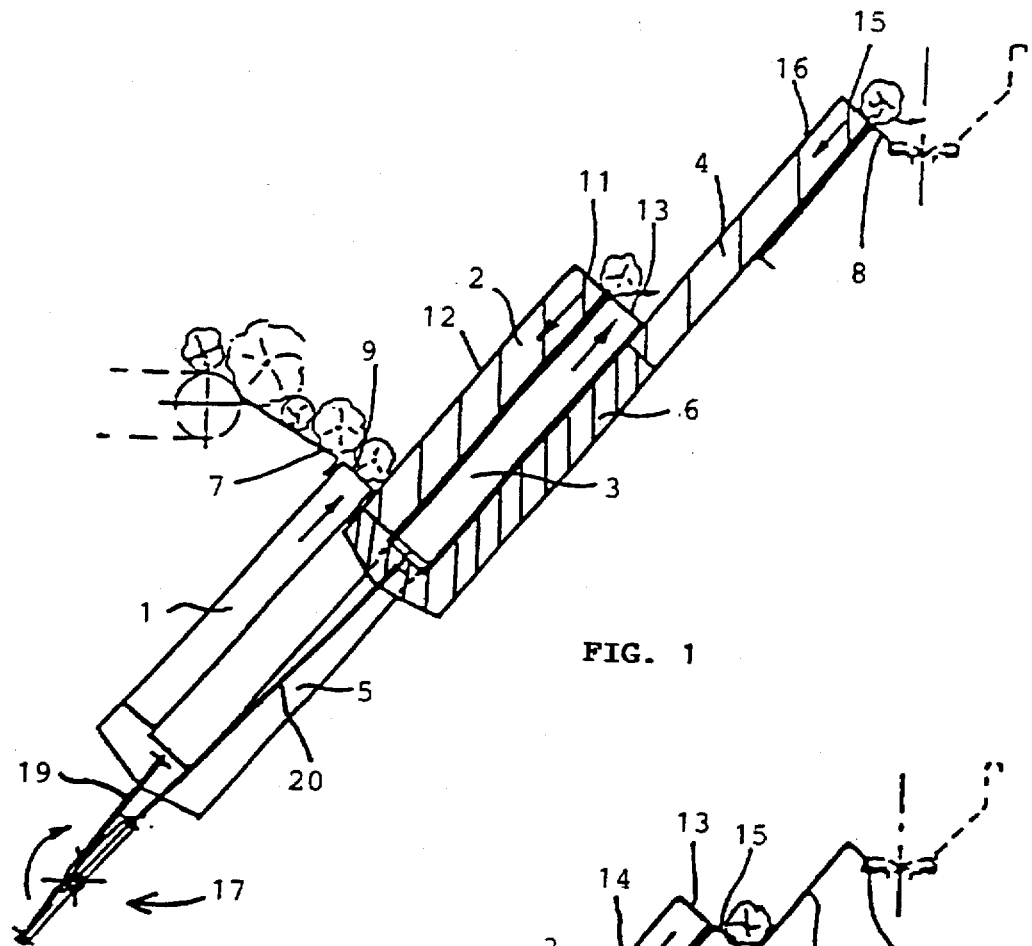

United States Patent [19]

Klockars et al.

[11] Patent Number: 5,678,681
[45] Date of Patent: Oct. 21, 1997

[54] STAIR-LIKE DEVICE WITH MOVING STEPS FOR FEEDING ELONGATED PIECES OF WOOD

[75] Inventors: Anders Bengt Olof Klockars, Lapvaartti; Gustaf Anders Nissen, deceased, late of Kaskinen, by Greta Nissen, heir; Pentti Rossi, deceased, late of Kaskinen, by Vappu Eila Tellervo Tuulikki Rossi, heir; Ossi Ilmari Alasaari, Kaskinen, all of Finland

[73] Assignee: Tahka Oy, Finland

[21] Appl. No.: 411,660

[22] PCT Filed: Oct. 6, 1993

[86] PCT No.: PCT/FI93/00401

§ 371 Date: Jun. 5, 1995

§ 102(e) Date: Jun. 5, 1995

[87] PCT Pub. No.: WO94/07779

PCT Pub. Date: Apr. 14, 1994

[30] Foreign Application Priority Data

Oct. 6, 1992 [FI] Finland ................ 924497

[51] Int. Cl.⁶ .................. B65G 25/00; B65G 47/26; B65G 37/00
[52] U.S. Cl. .............. 198/773; 198/459.3; 198/463.5
[58] Field of Search .............. 198/773, 459.5, 198/463.5; 414/746.1, 746.4

[56] References Cited

U.S. PATENT DOCUMENTS

| | | | |
|---|---|---|---|
| 1,630,438 | 5/1927 | Layland et al. | 198/773 |
| 3,168,190 | 2/1965 | Nienstedt | 198/773 |
| 3,524,532 | 8/1970 | Hobbs | 198/773 |
| 3,640,378 | 2/1972 | Elliott | 198/218 |
| 5,086,912 | 2/1992 | Howden, Jr. | 198/776 |

FOREIGN PATENT DOCUMENTS

| | | |
|---|---|---|
| 0 105 555 | 4/1984 | European Pat. Off. . |
| 1159849 | 12/1963 | Germany . |
| 93756 | 8/1938 | Sweden . |
| 48902 | 2/1989 | U.S.S.R. ............ 414/746.1 |

Primary Examiner—William E. Terrell
Assistant Examiner—Richard A. Chandler
Attorney, Agent, or Firm—Banner & Witcoff, Ltd.

[57] ABSTRACT

The present invention relates to an operating system for moving a feed apparatus of elongated pieces of timber, particularly logs, into a transversal feed apparatus, for moving reciprocatingly the feed apparatus, the feed apparatus being arranged to feed pieces of timber piece by piece from a reception point (7) to a discharge point (8) and the feed apparatus having a step-like configuration and the feed apparatus comprising a reception step member (1), which is movable reciprocatingly between the initial position thereof, in which the upper surface part (9) of the reception step member is substantially on the level of the reception point (7), and the discharge position, and a discharge step member (4), which is movable back and forth between the discharge position thereof, in which the upper surface part (15) of the discharge step member is substantially on the level of said discharge point, and the reception position thereof, and possibly one of more additional step members (2, 3). The feed apparatus is used in an operating system (17) comprising a crank system (18, 19, 20) operating the step members (1, 2, 3, 4).

3 Claims, 2 Drawing Sheets

STAIR-LIKE DEVICE WITH MOVING STEPS FOR FEEDING ELONGATED PIECES OF WOOD

The present invention relates to an operating means for moving back and forth a feed apparatus feeding elongated pieces of timber, particularly logs, into a transversal feed apparatus, said means being arranged for feeding pieces of timber piece by piece from a reception point to a discharge point, said feed apparatus having a stepped configuration, and said feed apparatus comprising a reception step member movable reciprocatingly between the initial position, in which the upper surface part of the reception step member is substantially on the level of said reception point, and the discharge position, and a discharge step member movable reciprocatingly between the discharge position, in which the upper surface part of the discharge step member is substantially on the level of said discharge point, and the reception position, and possibly one or more additional step members fitted between the reception step member and the discharge step member, and which can be moved reciprocatingly between the reception position and discharge position.

A transversal feeding apparatus is disclosed in the FI publication No. 78882. Said prior art means comprises both fixed and moving steps. In said prior art design logs are conveyed from a transversal conveyor or log table to a reception point on a lower level, from where they are fed piece by piece to a discharge point on an upper level, for which for instance a longitudinal conveyor may serve. Said transversal conveyor (or log table) and said longitudinal conveyor are substantially in one and same horizontal plane. Said means known in the art has not been designed, nor intended, for feeding logs to an essentially higher level relative to said transversal conveyor (or log table), instead, the primary function of said means is to feed logs piece by piece to the longitudinal conveyor. In the log processing sites it is quite often necessary to feed logs from a log table or equivalent to a longitudinal conveyor positioned even on a much higher level. When an apparatus such as the one disclosed in FI publication print No. 78882 is used, a chain log hoist has been provided in said instances in the adjacency thereof, thus usually increasing the investment and operation costs of the station. The feed apparatus according to said publication, operating according to the reciprocating movement principle and provided with heavy-weight elements, is relatively slow and susceptible to wear, because of which it also requires great force. The power units, such as hydraulic or pneumatic cylinders, being installed for moving the feed apparatus, are restricted as to their life time and therefore require a relatively powerful hydraulic or pressurized air pump as the operating power source.

A feed table for logs or equivalent is disclosed in the SE. patent publication No. 93756, provided with a stepped guide board, in the apertures whereof being arranged pistons to move logs onwards within the guide board pockets. The motion of the pistons is arranged by means of a complicated lever mechanism comprising a driving rod affixed on a cramp disc, to the pins whereof a T-shaped shaft has been pivoted, on the ends of the upper part whereof the piston ends being in turn pivoted. Also this means is relatively slow because the log is lifted to the next pocket each time across a step formed by the guide board. The complicated crank mechanism with the T levers is sensitive to wearing as great forces are directed at the pivots thereof.

The U.S. Pat. No. 3,524,532 in turn discloses a lifting means which is far more rapid compared with the means described in the above publications, in which the pieces are moved pushed by the ends of reciprocatingly moving lifting boards into a pocket provided by a subsequent board end. The boards have been so joined together that as a first board ascends the board adjacent thereto descends, thus opening a subsequent lifting pocket. The motion of the bodies being fed in has thereby been made more rapid. The joining of the lifting boards has been provided with a chain mechanism driven by a reciprocatingly rotating electric motor. Driving reciprocatingly an electric motor like this requires a powerful in proportion to the capacity required of a motor rotating in one direction only, in order to lift an equivalent load.

With the present invention, the above mentioned drawbacks can be avoided. With the aid of the invention, an operating means for a transversal feed apparatus can be provided which is simple in design and economic in use because of the modest power it requires, and because of the non-complicated design it is reliable in operation and appropriate for use as an operating means for a rapid feed apparatus of the type disclosed in the last mentioned publication. For said purpose, the invention is characterized in what is presented in the accompanying claims. The power of the motor of this operating means is, as taught by the invention, found to be dimensionable to about half of that of a feed apparatus of equivalent size and movable with hydraulic cylinders.

As taught by the invention, the feed apparatus can be of such type which is provided with a first and second stepped unit, said first stepped unit consisting of odd step members (i.e. first, third, possibly fifth, etc., counted from the point of reception), including a reception step member, and every second step unit consisting of even step members attached to each other, said stepped units being moreover arranged to move in opposite directions, whereby two adjacent step members, one of them being in the discharge position and the other in the reception position, are at the upper surface parts thereof substantially on the same transversal plane relative to the motion direction of said step members. Hereby, the crank means according to the present invention comprises a rotatable crankshaft placed below the stepped units, said shaft comprising at least two levers displaced by 180° relative to each other, whereby one of the levers being by means of a crank lever connected to a first step unit and the other lever by means of a crank lever connected to a second step unit.

As taught by the invention, the feed apparatus may also be of the type that it comprises a reciprocatingly movable stepped unit, consisting of step members attached to each other, said parts including a reception step member and a discharge step member, said step unit being arranged to be operating in association with a fixed step unit, whereby the mobile step member in the discharge position and the fixed step member are substantially on one and same transversal level at the upper surface parts relative to the motion direction of the step members.

The step members are at a given angle to the horizontal level. The magnitude of the angle is dependent, inter alia, on the thickness of the step members and on the diameter or thickness of the timber pieces to be transported. The lifting angle of the means may vary in the range from zero to 90°, preferably between 25° and 70°. The number of the step members is at least two, preferably from 2 to 8, though it may be even greater, being dependent on the lifting height desired.

Figure 2:
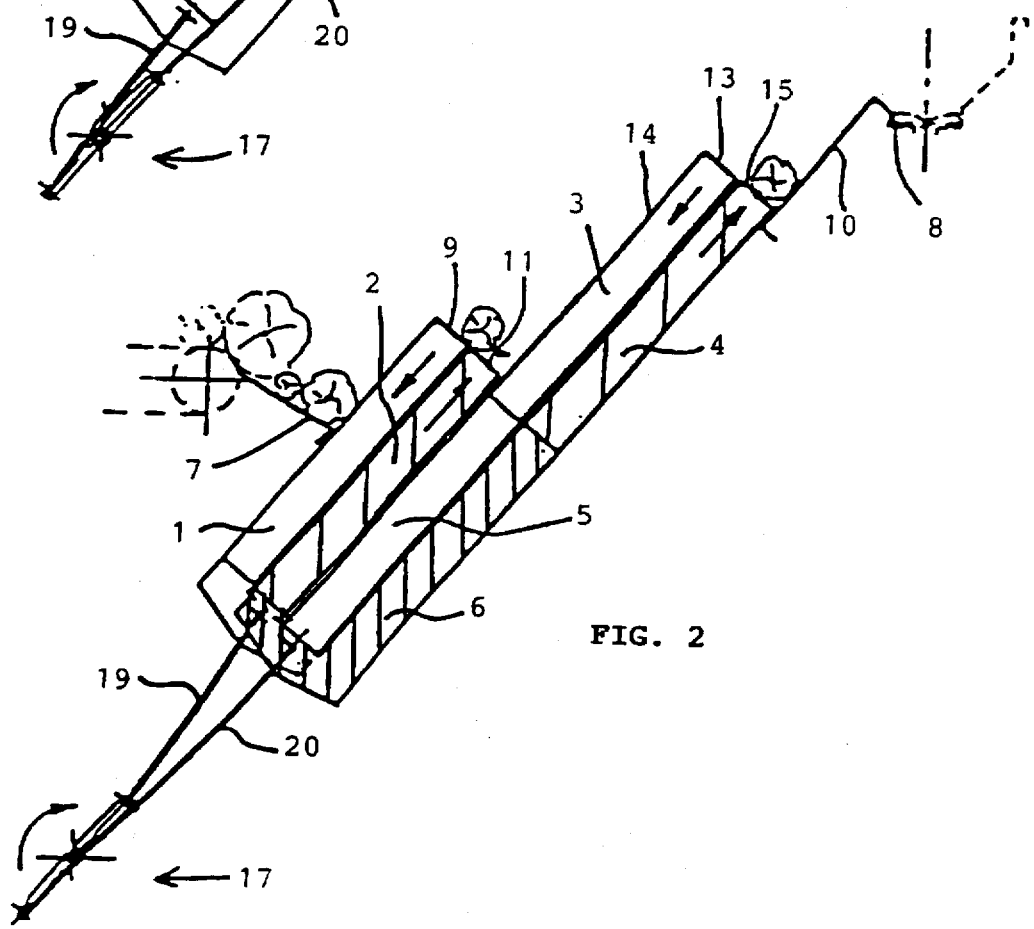
Figure 3:
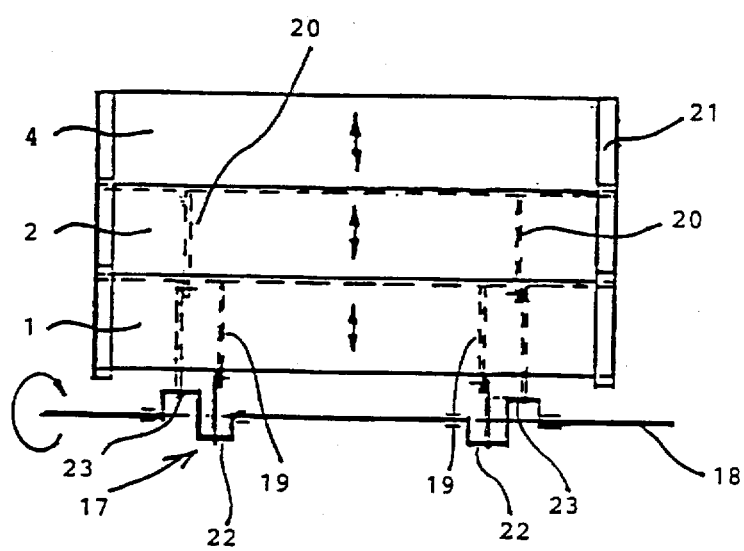
Figure 4:
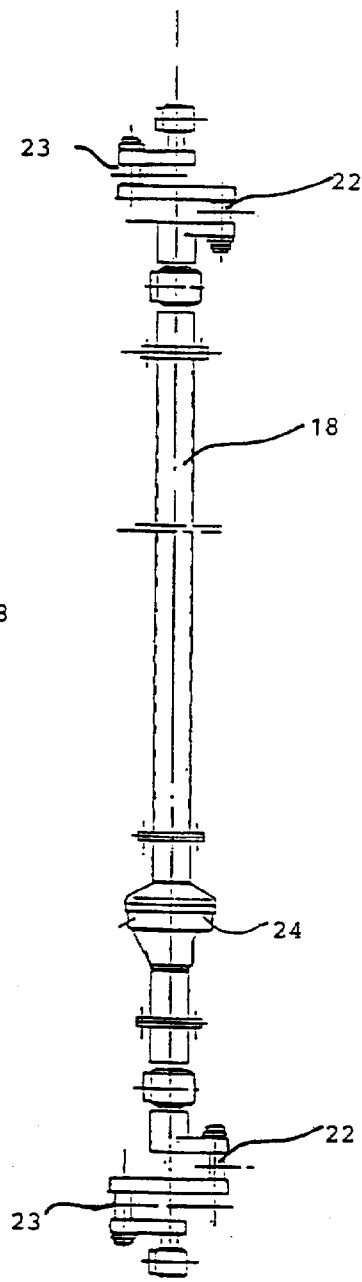

The invention is described below more in detail referring to the accompanying simplified drawings in which FIG. 1 presents, in lateral view, a means according to the invention, installed in a transversal feed apparatus feeding timber pieces, FIG. 2 shows the same apparatus as FIG. 1, but in another operational position, FIG. 3 shows the same apparatus as FIG. 1, now in front, and FIG. 4 presents the operating means in elevational view.

The feed apparatus for timber pieces is intended for feeding timber pieces piece by piece at a reception location, referred in FIG. 1 to by reference numeral 7, to a discharge location 8 on a higher level, which location can be a longitudinal conveyor.

The apparatus comprises a fixed frame (21 (see FIG. 3) and a feed apparatus disposed therein, and operating means 17 for the feed apparatus (FIGS. 1 to 4).

The feed apparatus comprises step members 1,2,3,4 guided by the ends thereof and bearably carried one on top of the other. The step members 1 to 4 have been produced into cross-sectionally rectangular profiles. The step members 1 and 3 have been mechanically attached by means of an intermediate piece 5. The parts 1,5 and 3 together constitute a first uniform step unit. The step members 2 and 4 have been linked mechanically by means of an intermediate piece 6. The parts 2, 6 and 4 constitute a second uniform step unit.

The first step unit 1,5,3 and the second step unit 2,6,4 are moved rectilinearly to-and-fro in opposite directions at the same speed.

Referring to FIGS. 1 to 4, the motion is provided by a crank means 17 comprising a crankshaft 18, this being provided with two levers 22 and 23 at two locations, said individual knees having at the same point shifted 180 degrees relative to each other. Each of the levers 22 in the same stage has individually been connected to the intermediate piece 5 by means of crank levers 19. Respectively, each of the other levers 23, being mutually in the same phase, has individually been connected to the intermediate piece 6 by means of crank levers 20. Thanks to said structure, the speed of the step units conforms to the sine curve when rotating the crankshaft 18.

The crankshaft 18 is driven by a fluid motor 24. In the design of FIG. 4, the motor 24 is provided with a through shaft.

The operation of the means of the present invention is described below more in detail, referring to FIGS. 1 to 4.

Timber pieces on a log table or equivalent move along an inclined plane 7 downwards, arriving at the point of reception. In FIG. 1 the step member 1 is in lower dead position, whereby the upper surface part 9 of the step member 1 lies on the same level with the reception point 7. The timber piece moves upon the upper surface part 9, being supported against the side surface part 12 of a subsequent step member 2. As a result of the rotary movement of the crankshaft 18, the step member 1 and the piece of timber thereon move upwards along the side surface 12. At the same time the step member 2 moves downwards until the step members 2 and 4 are in their lower dead position, and the step members 1 and 3 are in their upper dead position. Hereby, the crankshaft 18 has been rotated by 180°. Now, the piece of timber moves from the step member 1 to step member 2, being supported against the side surface part 14 (see FIG. 2). The rotation of the crankshaft 18 is continued, whereby the step members 1 and 3 move downwards and the step members 2 and 4 equally upwards until the initial position (see FIG. 1) is reached. Now, the crankshaft 18 has been rotated by 360 degrees. A new piece of timber moves along the inclined plane 7 onto the upper surface part 9 of the step member 1 at the same time as the piece of timber on the upper surface part 11 of the step member 2 moves onto the upper surface part 13 of the step member 3, and is supported to the side surface part 16 of the step member 4. The rotation of the crankshaft 18 is continued by 180°, said situation being shown in FIG. 2. The piece of timber on the upper surface part 9 of the step member 1 moves now on top of the upper surface part 11 of the step member 2, being supported to the side surface part 14 of the step member 3, and the piece of timber on top of the upper surface part 13 of the step member 3 moves onto the upper surface part 15 of the step member 4, being supported to the fixed wall 10. The rotation of the crankshaft 18 is continued until the feed apparatus is again in the position shown in FIG. 1. Hereby, a new piece of timber moves along the inclined plane 7 onto the upper surface part 9 of the step member 1, being supported against the side surface part 12 of the step member 2, the piece of timber on the upper surface part 11 of the step member 2 moving onto the upper surface part 13 of the step member 3 and being supported against the side surface part 16 of the step member 4, and the piece of timber on top of the upper surface part 15 of the step member 4 moves to the discharge point 8.

With the apparatus described above, a very high feeding capacity can be achieved, said apparatus being very reliable in operation particularly because of the simple structure of the operating means.

It is claimed:

1. An operating means for a transversal feed apparatus for elongated pieces of timber, particularly logs, so as to move said feed apparatus back and forth, said feed apparatus being arranged to feed pieces of timber piece by piece from a reception point (7) to a discharge point (8), said feed apparatus having a stepped shape and comprising first and second step units arranged to move in opposite directions, said first step unit (1, 5, 3) comprising a reception step member (1), which can be moved reciprocatingly between an initial position, in which an upper surface part (9) of the reception step member is essentially on the level of said reception point (7), and a discharge position, and said first step unit further comprising an additional step member (3) connected to the reception step member (1) by an intermediate piece; said second step unit (2, 6, 4) comprising a discharge step member (4) being reciprocatingly movable between a discharge position, in which an upper surface part (15) of the discharge step member is substantially on the level of said discharge point (8), and a reception position, and said second step unit further comprising an additional step member (2) connected to the discharge step member (4) by an intermediate piece, whereby two adjacent step members (1, 2; 2, 3; 3, 4), one of said two adjacent members (1; 2; 3) being in the discharge position and the other one of said adjacent members (2; 3; 4) in the reception position, are substantially on the same transversal level in the upper surface level thereof relative to the motion direction of the step members, characterized in that the operating means comprises a crank means (17) driving the first step unit (1, 5, 3) and the second step unit (2, 6, 4) and comprising a rotatable crankshaft (18) positioned under the step units, said crankshaft comprising at least two throws (22, 23) displaced by 180° relative to each other, whereby a first lever is attached to said first step intermediate piece and connects one (22) of the throws to the first step unit (1, 5, 3) and a second lever is attached to said second step unit intermediate piece and connects another of said throws to the second step unit (2, 6, 4).

2. Operating means according to claim 1, characterized in that the crankshaft (18) is operated by a hydraulic motor (24).

3. Operating means according to claim 2, characterized in that the hydraulic motor (24) is provided with a through shaft and mounted on the crankshaft (18).

* * * * *